United States Patent
Hsieh

(10) Patent No.: US 9,692,561 B2
(45) Date of Patent: Jun. 27, 2017

(54) METHOD OF HANDLING SOFT BUFFER SIZE FOR A TRANSPORT BLOCK AND RELATED COMMUNICATION DEVICE

(71) Applicant: ACER INCORPORATED, New Taipei (TW)

(72) Inventor: Chia-Wen Hsieh, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 205 days.

(21) Appl. No.: 14/617,881

(22) Filed: Feb. 9, 2015

(65) Prior Publication Data

US 2015/0256296 A1 Sep. 10, 2015

Related U.S. Application Data

(60) Provisional application No. 61/949,265, filed on Mar. 7, 2014.

(51) Int. Cl.
| | |
|---|---|
| *H04L 1/18* | (2006.01) |
| *H04L 12/861* | (2013.01) |
| *H04L 1/00* | (2006.01) |
| *H04L 27/36* | (2006.01) |
| *H04L 5/00* | (2006.01) |
| *H04L 27/34* | (2006.01) |

(52) U.S. Cl.
CPC ......... *H04L 1/1835* (2013.01); *H04L 1/0013* (2013.01); *H04L 1/1812* (2013.01); *H04L 1/1825* (2013.01); *H04L 1/1861* (2013.01); *H04L 5/0055* (2013.01); *H04L 27/366* (2013.01); *H04L 49/9005* (2013.01); *H04L 1/0067* (2013.01); *H04L 5/0064* (2013.01); *H04L 27/34* (2013.01)

(58) Field of Classification Search
CPC ... H04L 1/0013; H04L 1/0067; H04L 1/1812; H04L 1/1825; H04L 1/1835; H04L 1/1861; H04L 27/34; H04L 27/366; H04L 49/9005; H04L 5/0055; H04L 5/0064
See application file for complete search history.

(56) References Cited

U.S. PATENT DOCUMENTS

| | | | | |
|---|---|---|---|---|
| 2007/0189231 | A1* | 8/2007 | Chang | H04L 1/1893 370/335 |
| 2011/0274044 | A1 | 11/2011 | Park | |
| 2013/0051289 | A1* | 2/2013 | Hsieh | H04L 1/1845 370/280 |
| 2015/0103752 | A1* | 4/2015 | Yu | H04L 49/9005 370/329 |

(Continued)

FOREIGN PATENT DOCUMENTS

| | | |
|---|---|---|
| EP | 2 768 171 A1 | 8/2014 |
| KR | 1020130039700 A | 4/2013 |

(Continued)

*Primary Examiner* — Khaled Kassim
*Assistant Examiner* — Zhaohui Yang
(74) *Attorney, Agent, or Firm* — Winston Hsu

(57) ABSTRACT

A method of determining a soft buffer size for a transport block comprises determining a basic unit for the soft buffer size according to a legacy soft buffer size for the transport block and a first parameter, and determining the soft buffer size for the transport block according to the basic unit and a second parameter.

15 Claims, 10 Drawing Sheets

(56) References Cited

U.S. PATENT DOCUMENTS

2015/0172023 A1\* 6/2015 Yang .................. H04L 1/1671
370/329
2015/0256287 A1\* 9/2015 Davydov ............... H04B 7/028
370/329

FOREIGN PATENT DOCUMENTS

TW 201244507 A1 11/2012
TW 201408029 A 2/2014

\* cited by examiner

METHOD OF HANDLING SOFT BUFFER SIZE FOR A TRANSPORT BLOCK AND RELATED COMMUNICATION DEVICE

CROSS REFERENCE TO RELATED APPLICATIONS

This application claims the benefit of U.S. Provisional Application No. 61/949,265, filed on Mar. 7, 2014 and incorporated herein by reference.

BACKGROUND OF THE INVENTION

1. Field of the Invention

The present invention relates to a method used in a wireless communication system and related communication device, and more particularly, to a method of handling a soft buffer size for a transport block and related communication device.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of the universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple user equipments (UEs), and for communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint (CoMP) transmissions/reception, uplink (UL) multiple-input multiple-output (UL-MIMO), etc. For a UE and an eNB to communicate with each other in the LTE-A system, the UE and the eNB must support standards developed for the LTE-A system, such as the 3GPP Rel-10 standard or later versions.

A rate-matching procedure targets to match the number of bits in a transport block (TB) to the number of bits that can be transmitted within a transmission time interval (TTI) when a transmitter (e.g., eNB) prepares to transmit/retransmit the TB to a receiver (e.g., UE), wherein the number of bits transmitted within the TTI may be determined according to a soft buffer size for the TB for the rate-matching procedure. A hybrid automatic repeat request (HARQ) process starts to operate, when a receiver (eNB or UE) cannot decode a received packet successfully. The receiver stores soft values of a transmitted/retransmitted TB in a soft buffer of the receiver, and combines the soft values to increase a probability of successful decoding, wherein a size of the soft values stored by the receiver may be determined according to a soft buffer size for the TB for storing the soft values. The receiver continues the HARQ process until the TB is decoded correctly, or until a maximum number of retransmissions have been sent, at which time the HARQ process declares a failure and leaves it up to the HARQ process in radio link control (RLC) layer for trying again.

In a legacy LTE system, e.g., the LTE system or the LTE-A system, a maximum modulation level of 64 quadrature amplitude modulation (64QAM) is supported, and the storage efficiency of the soft buffer may not be a big issue for the receiver. However, an increased maximum modulation level (e.g., 256QAM) may be supported, when an enhanced technology (e.g., small cell enhancement) is implemented to improve performance of the legacy LTE system. That is, the maximum number of bits of a downlink shared channel (DL-SCH) TB received within a TTI may also be increased. In this situation, a method designed for partitioning a soft buffer of a UE and/or a network in the legacy LTE system may not be efficient for the increased maximum modulation level. Not only a blocking probability of a HARQ process may be increased in this scenario, but also coding/retransmission performance of the HARQ process may be degraded. The problem may be even worse when a carrier aggregation (CA) is supported, where multiple cells (e.g., multiple component carriers) are operated at the same time and a larger number of HARQ processes may occur.

Thus, improving the performance of the HARQ process is an important problem to be solved.

SUMMARY OF THE INVENTION

The present invention therefore provides a method for handling a soft buffer size for a transport block, to solve the abovementioned problems.

A method of determining a soft buffer size for a transport block comprises determining a basic unit for the soft buffer size according to a legacy soft buffer size for the transport block and a first parameter, and determining the soft buffer size for the transport block according to the basic unit and a second parameter.

A communication device for determining a soft buffer size for a transport block comprises a storage unit for storing instructions of determining a basic unit for the soft buffer size according to a legacy soft buffer size for the transport block and a first parameter, and determining the soft buffer size for the transport block according to the basic unit and a second parameter, and a processing means, coupled to the storage unit, configured to execute the instructions stored in the storage unit.

A computer program product for determining a soft buffer size for a transport block comprises a computer-readable medium comprising a first set of codes for causing the computer program product to determine a basic unit for the soft buffer size according to a legacy soft buffer size for the transport block and a first parameter, and a second set of codes for causing the computer program product to determine the soft buffer size for the transport block according to the basic unit and a second parameter.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
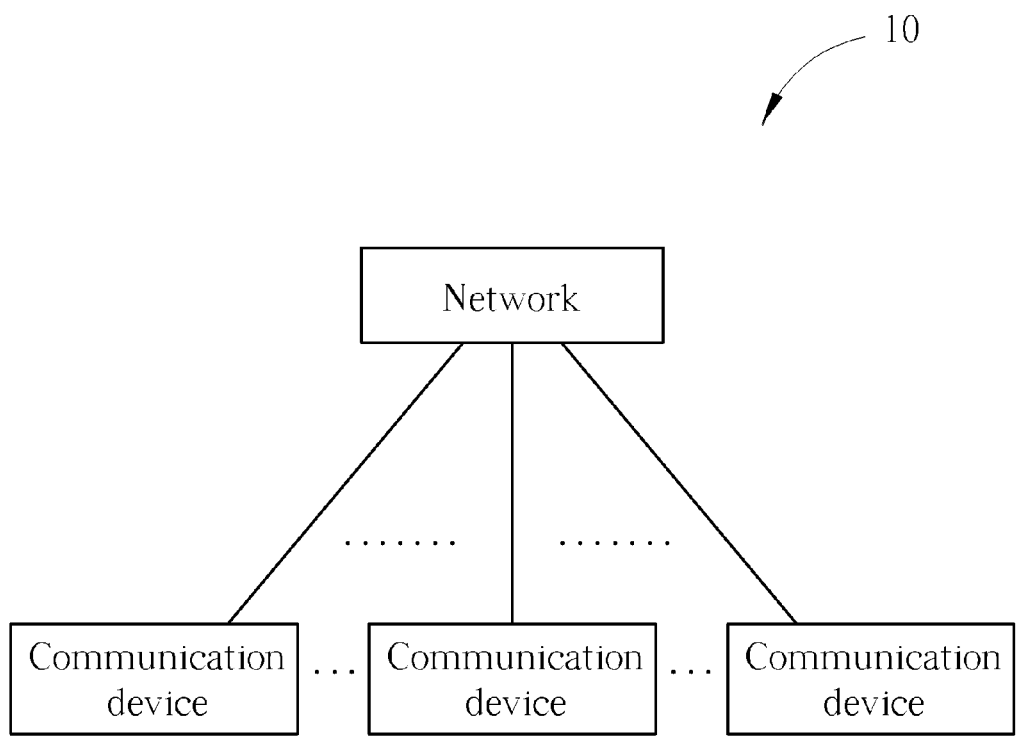
FIG. 1 is a schematic diagram of a wireless communication system according to an example of the present invention.

Please refer to FIG. 1, which is a schematic diagram of a wireless communication system 10 according to an example of the present invention. The wireless communication system 10 is briefly composed of a network and a plurality of communication devices. The wireless communication system 10 may support a time-division duplexing (TDD) mode, a frequency-division duplexing (FDD) mode or a TDD-FDD joint operation mode. That is, the network and a communication device may communicate with each other via FDD carrier (s) and/or TDD carrier(s). In addition, the wireless communication system 10 may support a carrier aggregation (CA). That is, the network and a communication device may communicate with each other via multiple cells (e.g., multiple carriers) including a primary cell (e.g., primary component carrier) and one or more secondary cells (e.g., secondary component carriers). The abovementioned cells may be operated in the same or different duplexing modes. For example, each cell may be a FDD cell (or TDD cell), when the cells are operated in the same duplexing mode. There are several scenarios, when the cells are operated in different duplexing modes (e.g. TDD-FDD joint operation). For example, the primary cell may be a TDD carrier, and a secondary cell may be a FDD carrier. In another example, the primary cell may be the FDD carrier, and the secondary cell may be the TDD carrier. For the CA conforming to the 3GPP LTE Rel-10/11/12, 5 cells (e.g., serving cells) may be supported by the communication device and the network.

In FIG. 1, the network and the communication devices are simply utilized for illustrating the structure of the wireless communication system 10. Practically, the network may be a universal terrestrial radio access network (UTRAN) comprising a plurality of Node-Bs (NBs) in a universal mobile telecommunications system (UMTS). In another example, the network may be an evolved UTRAN (E-UTRAN) comprising a plurality of evolved NBs (eNBs) and/or relays in a long term evolution (LTE) system, a LTE-Advanced (LTE-A) system or an evolution of the LTE-A system.

Furthermore, the network may also include both the UTRAN/E-UTRAN and a core network, wherein the core network includes network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network receives information transmitted by a communication device, the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. In addition, the information may be processed by both the UTRAN/E-UTRAN and the core network, and the decisions are made after coordination and/or cooperation are performed by the UTRAN/E-UTRAN and the core network.

A communication device may be a user equipment (UE), a low cost device (e.g., machine type communication (MTC) device), a device-to-device (D2D) device, a mobile phone, a laptop, a tablet computer, an electronic book, a portable computer system, or combination thereof. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
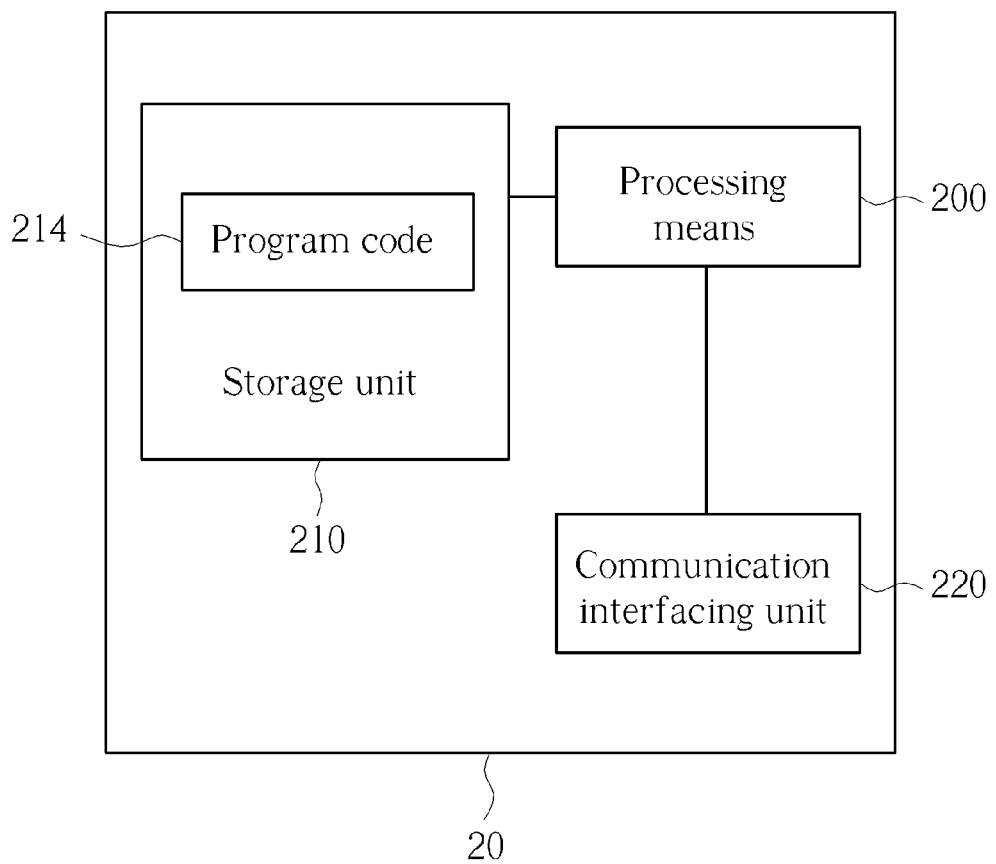
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that may store a program code 214, accessed and executed by the processing means 200. Examples of the storage unit 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage unit, non-transitory computer-readable medium (e.g., tangible media), etc. The communication interfacing unit 220 is preferably a transceiver and is used to transmit and receive signals (e.g., data, messages and/or packets) according to processing results of the processing means 200.

Figure 3:
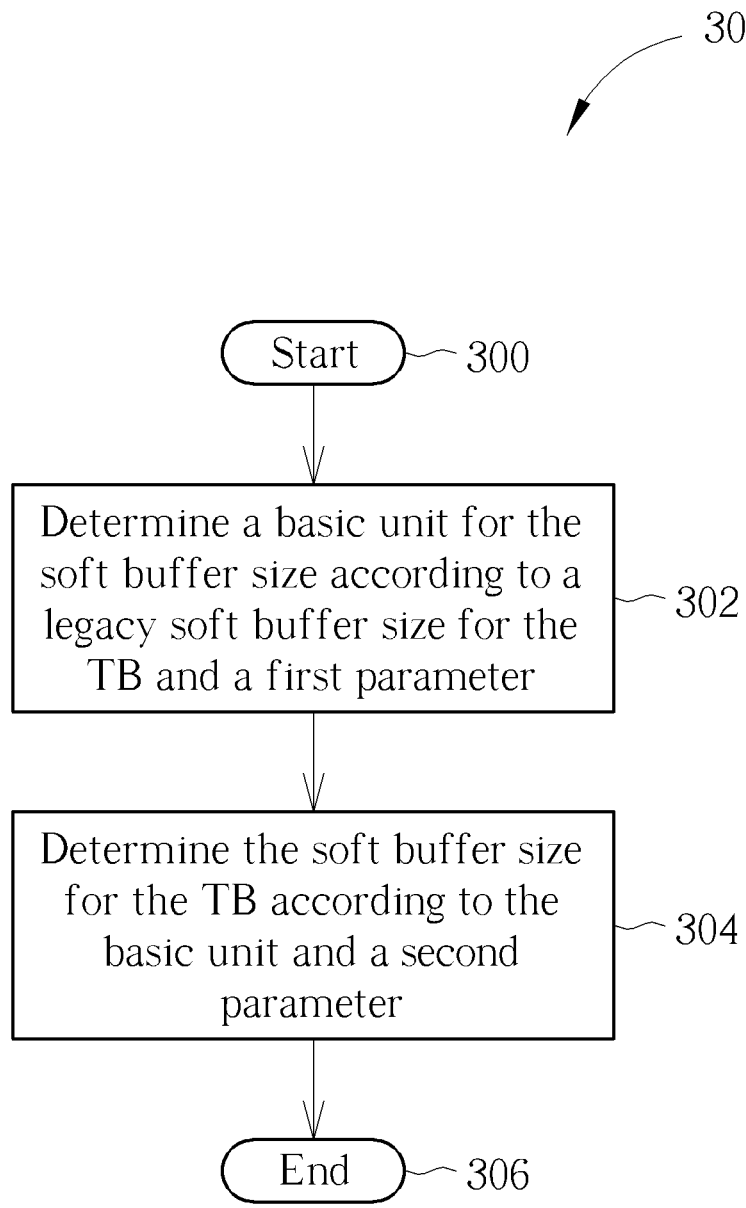
FIG. 3 is a flowchart of a process according to an example of the present invention.

FIG. 3 is a flowchart of a process 30 according to an example of the present invention. The process 30 may be utilized in a communication device, the network or both shown in FIG. 1, to handling a soft buffer size for a transport block (TB) (e.g., in a transmission time interval (TTI)). The process 30 may be compiled into the program code 214 and includes the following steps:

Step 300: Start.

Step 302: Determine a basic unit for the soft buffer size according to a legacy soft buffer size for the TB and a first parameter.

Step 304: Determine the soft buffer size for the TB according to the basic unit and a second parameter.

Step 306: End.

According to the process 30, the communication device determines a basic unit for the soft buffer size according to a legacy soft buffer size for the TB and a first parameter. Then, the communication device determines the soft buffer size for the TB according to the basic unit and a second parameter. In one example, the legacy soft buffer size for the TB may correspond to (e.g., be used for) a modulation level (e.g., maximum modulation level) not greater than 64 quadrature amplitude nodulation (64QAM). That is, for the communication device, the legacy soft buffer size for the TB may be a size of a partition of a soft buffer for storing a hybrid automatic repeat request (HARQ) process (e.g., DL HARQ processes) of a TB, when the maximum modulation level of the TB is equal to or lower than 64QAM. The soft buffer size for the TB may correspond to a modulation level (e.g., maximum modulation level) greater than 64QAM. That is, for the communication device, the soft buffer size for the TB determined according to the process 30 may be a size of a partition of a soft buffer for storing a HARQ process (e.g., DL HARQ processes) of a TB, when the maximum modulation level of the TB (e.g., 256QAM) may be greater than 64QAM. Preferably, the basic unit for the soft buffer size for the TB may be not greater than the legacy soft buffer size for the TB. That is, the legacy soft buffer size may be divided into at least one basic unit according to the process 30, to increase flexibility of usage of the soft buffer. Thus, according to the process 30, a blocking probability of a HARQ process (e.g., DL HARQ processes) may be decreased, and coding/retransmission performance of the HARQ process may be improved.

Similarly, according to the process 30, the network may determine a basic unit for a soft buffer size for a TB according to a legacy soft buffer size for the TB and a first parameter. Then, the network determines the soft buffer size for the TB according to the basic unit and a second parameter. In one example, the legacy soft buffer size for the TB may correspond to (e.g., be used for) a modulation level (e.g., maximum modulation level) not greater than 64QAM. That is, for the network, the legacy soft buffer size for the TB may be a size of a partition of a soft buffer for performing a rate-matching procedure of a TB, when the maximum modulation level of the TB is equal to or lower than 64QAM. The soft buffer size for the TB may correspond to a modulation level (e.g., maximum modulation level) greater than 64QAM. That is, for the network, the soft buffer size for the TB determined according to the process 30 may be a size of a partition of a soft buffer for performing a rate-matching procedure of a TB, when the maximum modulation level of the TB (e.g., 256QAM) may be greater than 64QAM. Preferably, the basic unit for the soft buffer size for the TB may be not greater than the legacy soft buffer size for the TB. That is, the legacy soft buffer size for the TB may be divided into at least one basic unit according to the process 30, to increase flexibility of usage of the soft buffer. Thus, according to the process 30, a blocking probability of a HARQ process (e.g., DL HARQ processes) may be decreased and coding/retransmission performance of the HARQ process may be improved.

Realization of the process 30 is not limited to the above description. In the following examples, operation of a communication device in FIG. 1 is used to illustrate various realizations of the present invention. However, the examples may also be realized by the network in FIG. 1, and is not limited herein. In addition, a HARQ process in the following examples may be a DL HARQ process or a UL HARQ process.

In one example, the first parameter may be determined according to channel quality related to a channel for transmitting the TB. Similarly, the second parameter may be determined according to channel quality related to a channel for transmitting the TB. In one example, the first parameter may be determined according to a user equipment (UE) category of a communication device processing (e.g., transmitting or receiving) the TB. Similarly, the second parameter may be determined according to a UE category of a communication device processing (e.g., transmitting or receiving) the TB. In one example, the first parameter may be a cell-specific parameter (e.g., when a communication device and/or the network processing the TB is configured with multiple cells). Similarly, the second parameter may be a cell-specific parameter (e.g., when a communication device and/or the network processing the TB is configured with multiple cells). In one example, the first parameter may be determined according to a size of the TB (i.e., TB size). Similarly, the second parameter may be determined according to a size of the TB. In one example, the first parameter may be determined according to a maximum TB size. Similarly, the second parameter may be determined according to a maximum TB size.

According to the process 30, a communication device may allocate a first HARQ process corresponding to the TB (s) in at least one basic unit of a soft buffer according to the soft buffer size for the TB if the first HARQ process is not correctly received. Further, the communication device may store a second HARQ process, if the second HARQ process is not correctly received. The communication device may allocate the second HARQ process corresponding to another TB(s) in other basic unit (s) of the soft buffer according to the soft buffer size again, e.g., if there is available space in the soft buffer. The communication device may release part of the at least one basic unit of the first HARQ process and allocate the second HARQ process in the part of the at least one basic unit according to the soft buffer size, e.g., if there is no available space in the soft buffer. In another example, the network may perform a rate-matching procedure on the TB according to the soft buffer size in the process 30 and/or the above description. That is, the examples in the present invention can be applied to both the HARQ process and the rate-matching procedure.

Figure 4:
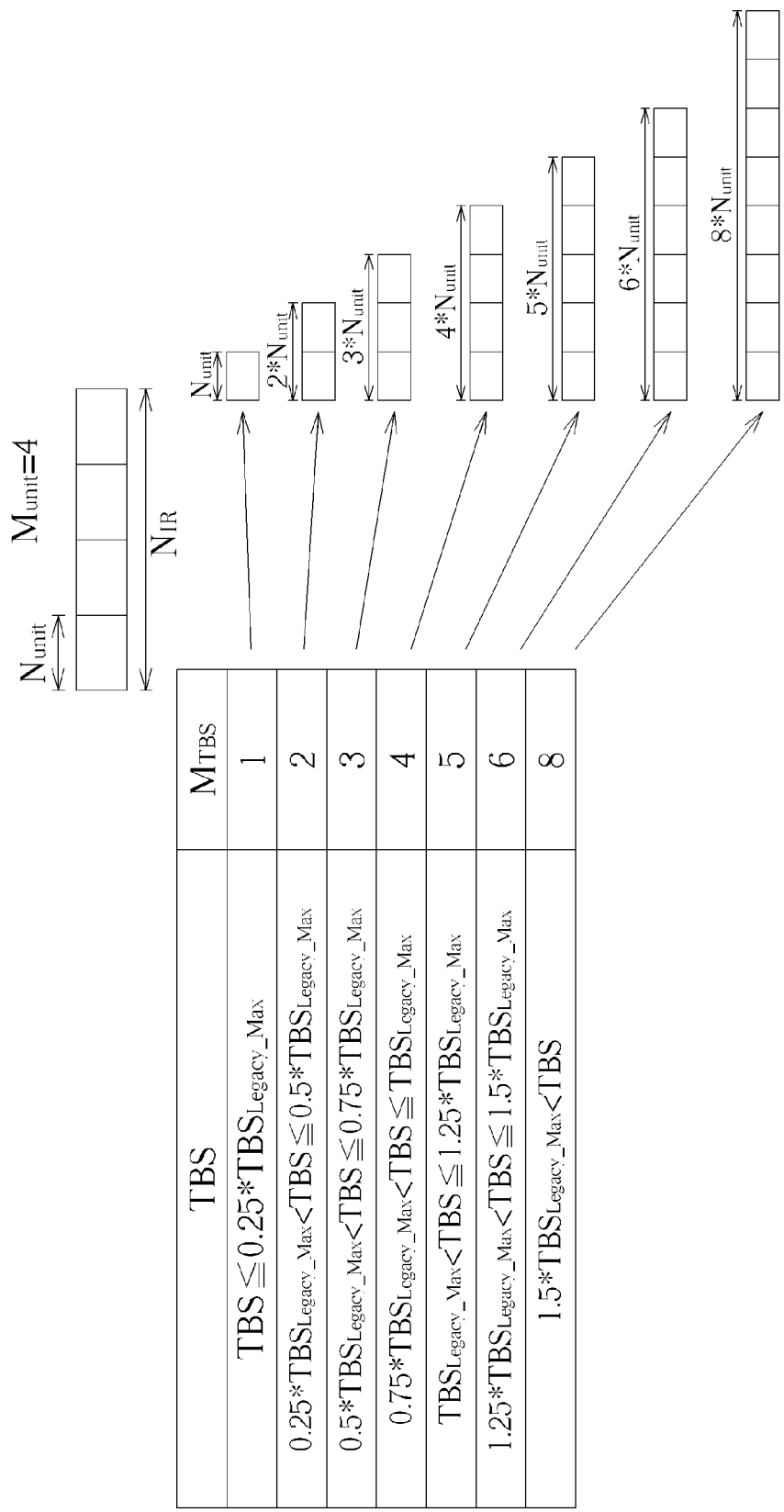
FIG. 4 is a schematic diagram of determination of the second parameter in the process 30 according to an example of the present invention.

FIG. 4 is a schematic diagram of determination of the second parameter in the process 30 according to an example of the present invention. The basic unit, the first parameter, the second parameter, the legacy soft buffer size for a TB and the soft buffer size for the TB are denoted as $N_{unit}$, $M_{unit}$, $M_{TBS}$, $N_{IR}$ and $M_{TBS}*N_{unit}$, respectively, according to the process 30. The maximum TB size for a modulation level not greater than 64QAM is denoted as $TBS_{Legacy\_Max}$, and the TB size of the TB is denoted as TBS. In the present example, the basic unit can be obtained as $$N_{unit} = \frac{N_{IR}}{M_{unit}} = \frac{N_{IR}}{4},$$

after assuming the first parameter $M_{unit}=4$. Then, the soft buffer size for the TB can be obtained as $$M_{TBS} * N_{UNIT} = M_{TBS} * \frac{N_{IR}}{4},$$

wherein the second parameter $M_{TBS}$ depends on TBS. As shown in FIG. 4, the legacy soft buffer size for the TB $N_{IR}$ is divided into 4 basic units (each with the size of $N_{unit}$). For example, a HARQ process may be stored in 6 basic units of the soft buffer wherein a size of each basic unit is $N_{unit}$, if the criterion "$1.25TBS_{Legacy\_Max} < TBS \leq 15TBS_{Legacy\_Max}$" is satisfied. The soft buffer sizes for corresponding TB sizes (i.e., $M_{TBS}$) are shown at the right hand side of FIG. 4.

Similarly, the network can determine the soft buffer size for the TB according to FIG. 4, to perform a rate-matching procedure. In detail, the network may obtain the basic unit as $$N_{unit} = \frac{N_{IR}}{M_{unit}} = \frac{N_{IR}}{4},$$

after assuming the first parameter $M_{unit}=4$. Then, the network may obtain the soft buffer size for the TB as $$M_{TBS} * N_{unit} = M_{TBS} * \frac{N_{IR}}{4},$$

wherein the second parameter $M_{TBS}$ depends on TBS. For example, the network may determine that the soft buffer size for the TB is $5*N_{unit}$, if the criterion "$TBS_{Legacy\_Max} < TBS \le 1.25 TBS_{Legacy\_Max}$" is satisfied.

Figure 5:
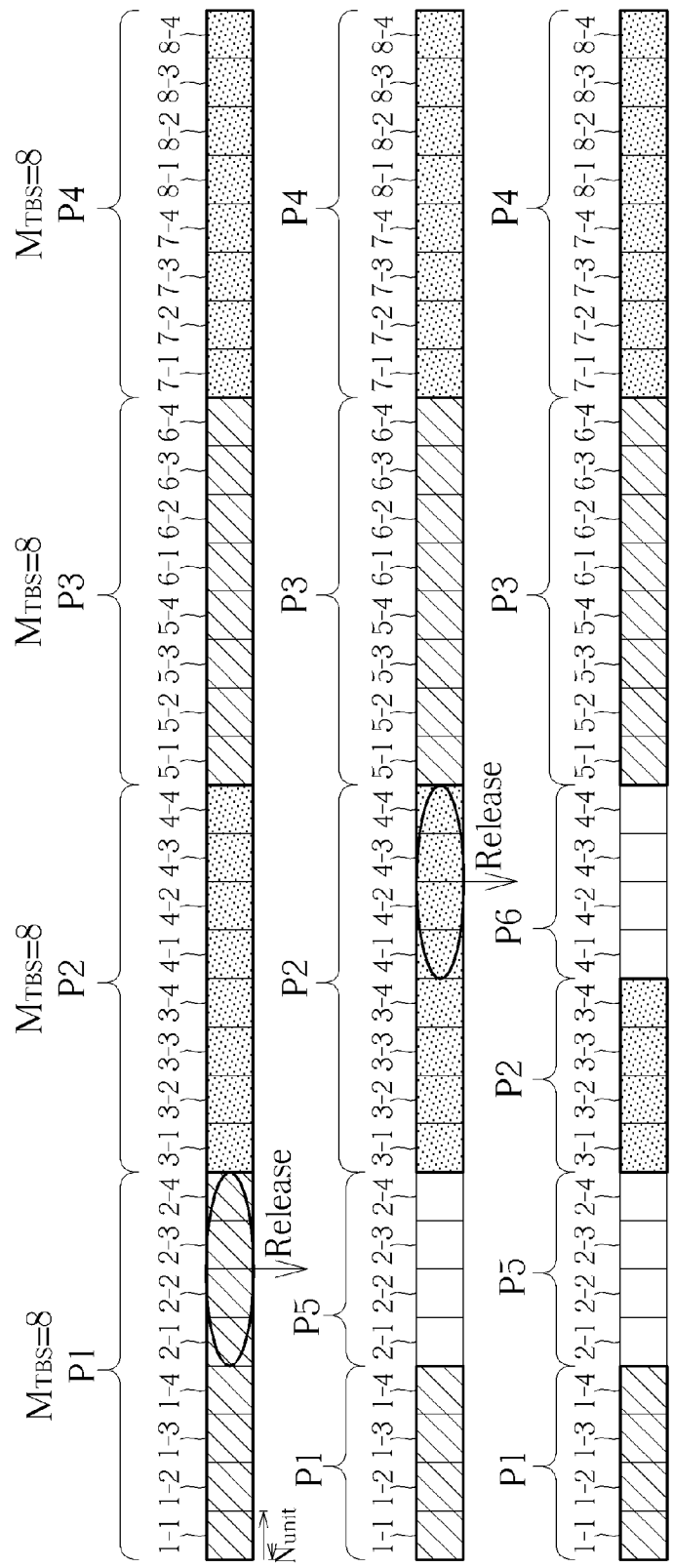
FIG. 5 is a schematic diagram of states of a soft buffer of a communication device according to an example of the present invention.

FIG. 5 is a schematic diagram of states of a soft buffer of a communication device according to an example of the present invention. The soft buffer of the communication device is divided into 32 basic units "x-y", where $1 \le x \le 8$ and $1 \le y \le 4$. At the beginning, 4 HARQ processes P1-P4 are stored in sets of the basic units of the soft buffer, and $M_{TBS}$ (i.e., the second parameter in the process 30) of each of the HARQ processes P1-P4 is 8. The soft buffer is fully occupied by the HARQ process P1-P4, as shown at the first row of FIG. 5. For example, the HARQ process P1 is stored in the basic units "1-1", ..., "1-4" and "2-1", ..., "2-4". According to the present invention, the communication device may release the basic units "2-1", ..., "2-4", and allocate a HARQ process P5 in the released basic units, if the communication device needs to store the HARQ process P5 due to an unsuccessful reception of the HARQ process P5, as shown at the second row of FIG. 5. Similarly, the communication device may release the basic units "4-1", ..., "4-4", and allocate a HARQ process P6 in the released basic units, if the communication device needs to store the HARQ process P6 due to an unsuccessful reception of the HARQ process P6, as shown at the third row of FIG. 5. Thus, according to the description, the communication device can store the HARQ processes flexibly and efficiently. As a result, a blocking probability of a HARQ process may be decreased, and coding/retransmission performance of the HARQ process may be improved.

Figure 6:
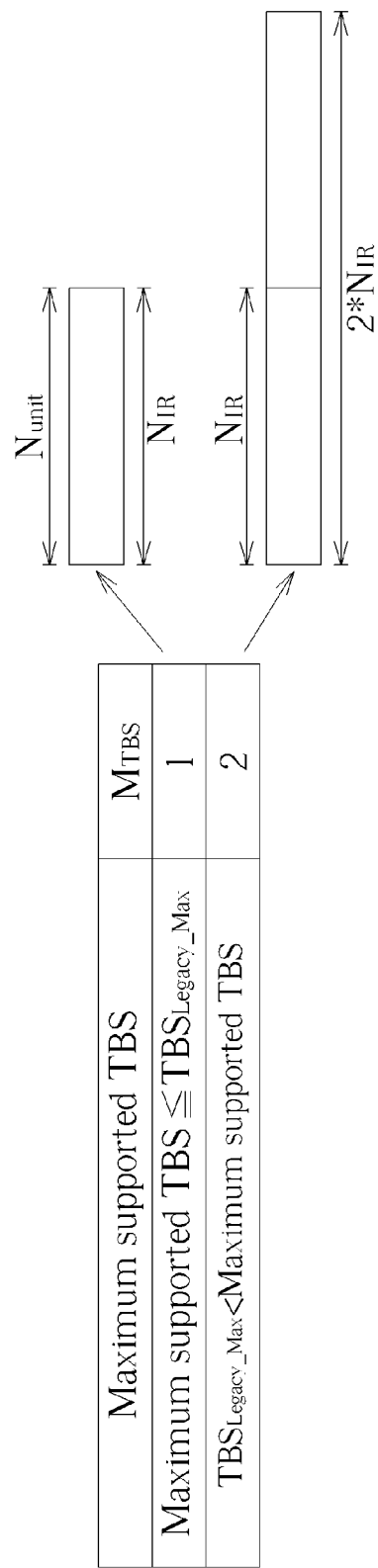
FIG. 6 is a schematic diagram of determination of the second parameter in the process 30 according to an example of the present invention.

FIG. 6 is a schematic diagram of determination of the second parameter in the process 30 according to an example of the present invention. The basic unit, the first parameter, the second parameter, the legacy soft buffer size for a TB and the soft buffer size for the TB are denoted as $N_{unit}$, $M_{unit}$, $M_{TBS}$, $N_{IR}$ and $M_{TBS}*N_{unit}$, respectively, according to the process 30. The maximum TB size for a modulation level not greater than 64QAM is denoted as $TBS_{Legacy\_Max}$, and the TB size of the TB is denoted as TBS. In the present example, the basic unit can be obtained as $$N_{unit} = \frac{N_{IR}}{M_{unit}} = \frac{N_{IR}}{1},$$

after assuming the first parameter $M_{unit}=1$. Then, the soft buffer size for the TB can be obtained as $M_{TBS}*N_{unit}=M_{TBS}*N_{IR}$, wherein the second parameter $M_{TBS}$ depends on the maximum TBS. As shown in FIG. 6, there are only two values of $M_{TBS}$ according to the present example, wherein the case of "$M_{TBS}=2$" may be used when the maximum TBS for a modulation level greater than 64QAM (e.g., 256QAM) which is greater than the legacy maximum TBS for a modulation level not greater than 64QAM. The soft buffer sizes for corresponding maximum TBSs (i.e., $M_{TBS}$) are shown at the right hand side of FIG. 6. For example, a HARQ process may be stored in 2 basic units of the soft buffer wherein a size of each basic unit is $N_{IR}$, if the criterion "$TBS_{Legacy\_Max} <$ maximum TBS" is satisfied.

Figure 7:
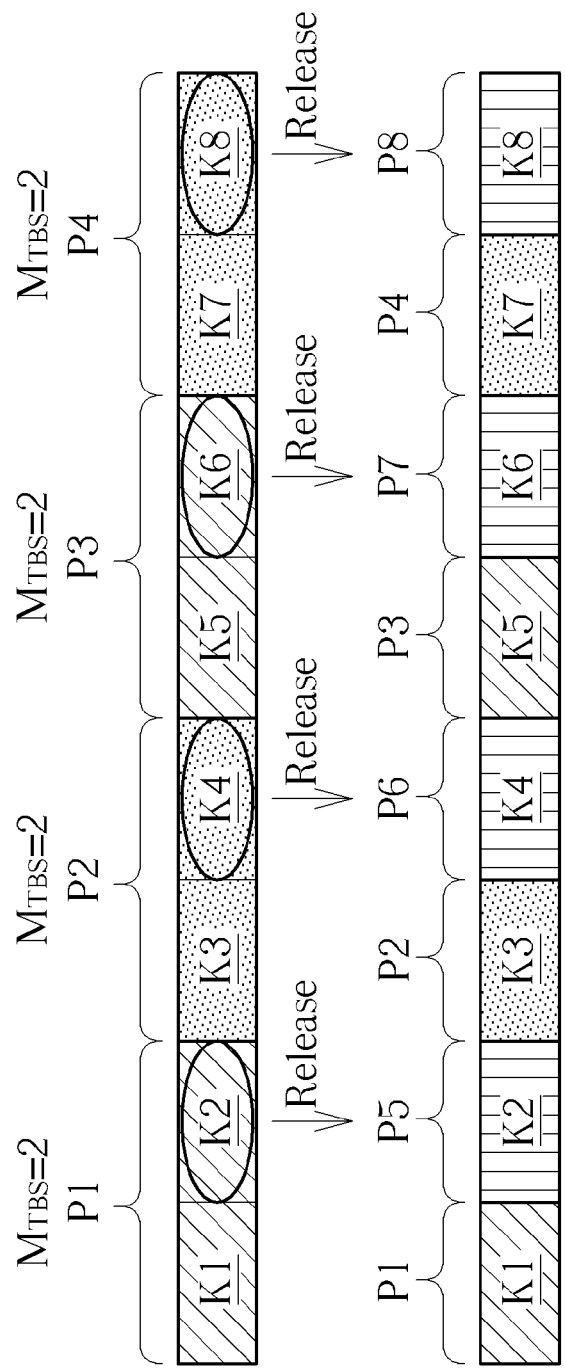
FIG. 7 is a schematic diagram of states of a soft buffer of a communication device according to an example of the present invention.

FIG. 7 is a schematic diagram of states of a soft buffer of a communication device according to an example of the present invention. The soft buffer of the communication device is divided into 8 basic units K1-K8. At the beginning, 4 HARQ processes P1-P4 are stored in sets of the basic units of the soft buffer, and $M_{TBS}$ (i.e., the second parameter in the process 30) of each of the HARQ processes P1-P4 is 2. The soft buffer is fully occupied by the HARQ processes P1-P4, as shown at the first row of FIG. 7. For example, the HARQ process P1 is stored in the basic units K1 and K2. According to the present invention, the communication device may release the basic unit K2, and allocate a HARQ process P5 in the released partition, if the communication device needs to store the HARQ process P5 due to an unsuccessful reception of the HARQ process P5, as shown at the second row of FIG. 7. Similarly, the communication device may release the basic units K4, K6 and K8, and allocate HARQ process P6, P7 and P8 in the basic units K4, K6 and K8, respectively, if the communication device needs to store the HARQ process P6, P7 and P8 due to unsuccessful receptions of the HARQ process P6, P7 and P8. Thus, according to the description, the communication device can store the HARQ processes flexibly and efficiently. As a result, a blocking probability of a HARQ process may be decreased, and coding/retransmission performance of the HARQ process may be improved.

As stated previously, the first parameter and/or the second parameter in the process 30 may be cell-specific parameter(s). Properties of the cell-specific parameter(s) are illustrated in the following examples, wherein the communication device is configured with two cells CC1 and CC2.

Figure 8:
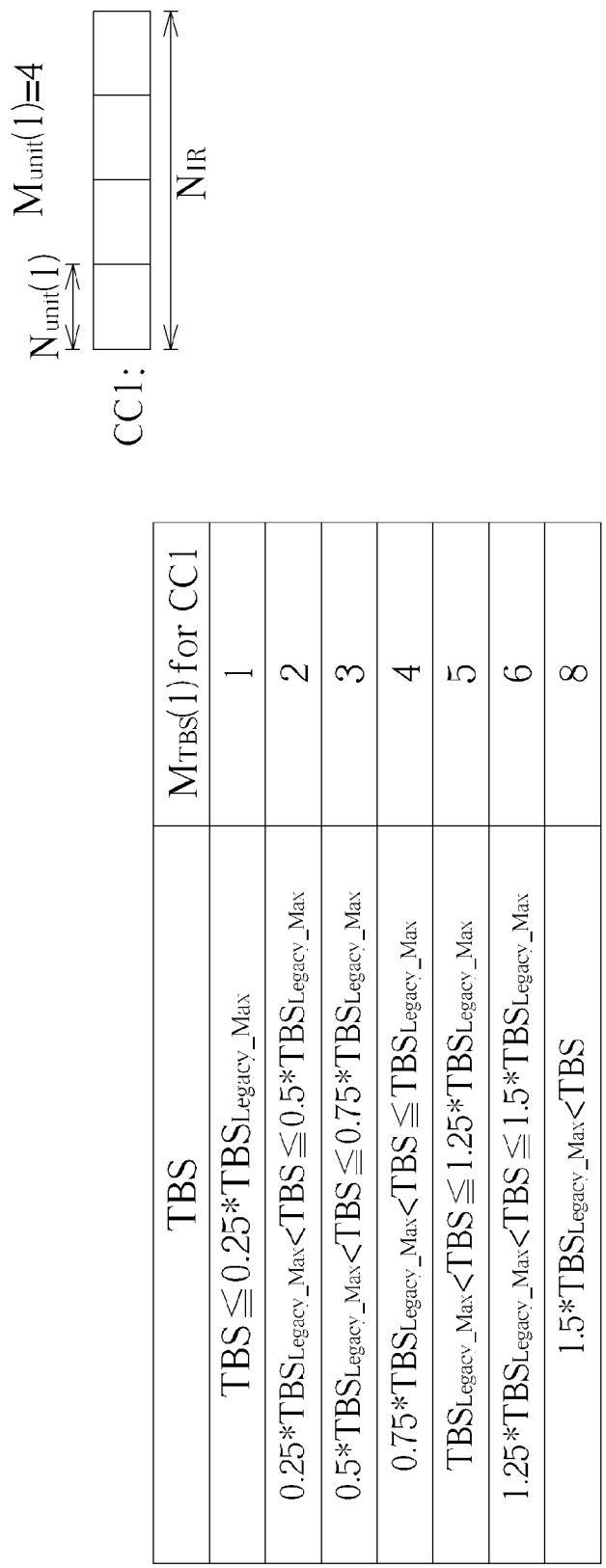
FIGS. 8-10 are schematic diagrams of determination of the second parameter in the process 30 according to examples of the present invention.

FIG. 8 is a schematic diagram of determination of the second parameter in the process 30 according to an example of the present invention. The basic unit, the first parameter, the second parameter, the legacy soft buffer size for a TB and the soft buffer size for the TB are denoted as $N_{unit}(1)$, $M_{unit}(1)$, $M_{TBS}(1)$, $N_{IR}$ and $M_{TBS}(1)*N_{unit}(1)$, respectively, according to the process 30. The parameters and the relations therein with the index "(1)" are used for the cell CC1. The maximum TB size for a modulation level not greater than 64QAM is denoted as $TBS_{Legacy\_Max}$, and the TB size of the TB is denoted as TBS. In the present example, the basic unit can be obtained as $$N_{unit}(1) = \frac{N_{IR}}{M_{unit}(1)} = \frac{N_{IR}}{1},$$

after assuming the first parameter $M_{unit}(1)=4$. Then, the soft buffer size for the TB can be obtained as $$M_{TBS}(1) * N_{unit}(1) = M_{TBS}(1) * \frac{N_{IR}}{4},$$

wherein the second parameter $M_{TBS}(1)$ depends on TBS. As shown in FIG. 8, the legacy soft buffer size for the TB $N_{IR}$ is divided into smaller basic units (each with the size $N_{unit}(1)$). For example, a HARQ process of the cell CC1 may be stored in 5 basic units of the soft buffer wherein a size of each basic unit is $N_{unit}(1)$, if the criterion "$TBS_{Legacy\_Max} < TBS \leq 1.25 TBS_{Legacy\_max}$" is satisfied.

Figure 9:
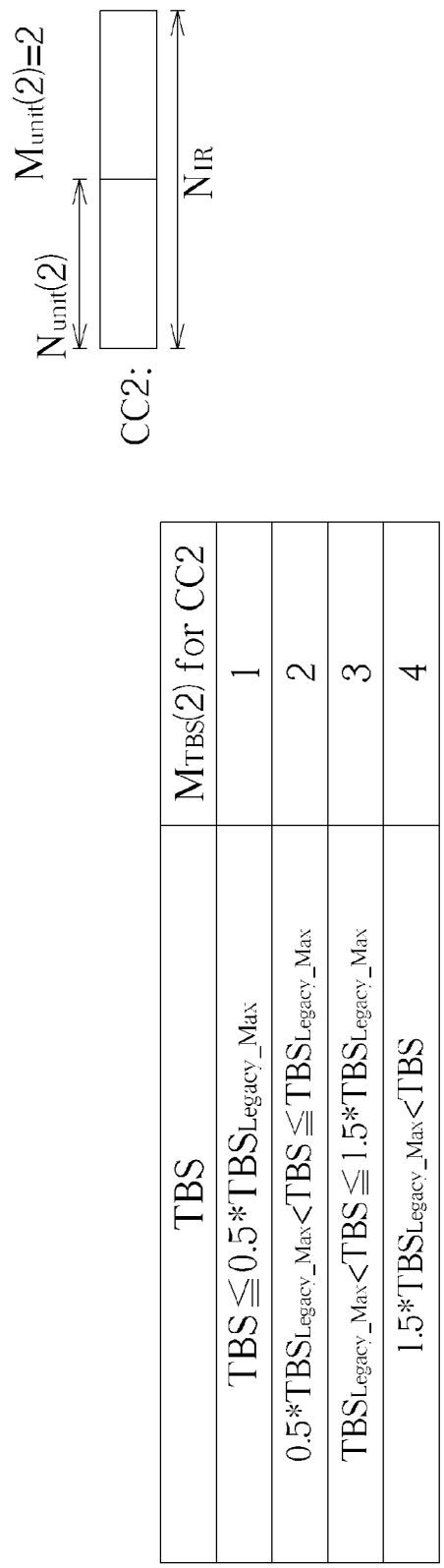

FIG. 9 is a schematic diagram of determination of the second parameter in the process 30 according to an example of the present invention. The basic unit, the first parameter, the second parameter, the legacy soft buffer size for a TB and the soft buffer size for the TB are denoted as $N_{unit}(2)$, $M_{unit}(2)$, $M_{TBS}(2)$, $N_{IR}$ and $M_{TBS}(2)*N_{unit}(2)$, respectively, according to the process 30. The parameters and the relations therein with the index "(2)" are used for the cell CC2. The maximum TB size for a modulation level not greater than 64QAM is denoted as $TBS_{Legacy\_max}$, and the TB size of the TB is denoted as TBS. In the present example, the basic unit can be obtained as $$N_{unit}(2) = \frac{N_{IR}}{M_{unit}(2)} = \frac{N_{IR}}{2},$$

after assuming the first parameter $M_{unit}(2)=2$. Then, the soft buffer size for the TB can be obtained as $$M_{TBS}(2) * N_{unit}(2) = M_{TBS}(2) * \frac{N_{IR}}{2},$$

wherein the second parameter $M_{TBS}(2)$ depends on TBS. As shown in FIG. 9, the legacy soft buffer size for the TB $N_{IR}$ is divided into 2 basic units (each with the size $N_{unit}(2)$). For example, a HARQ process of the cell CC2 may be stored in 3 basic units of the soft buffer wherein a size of each basic unit is $N_{unit}(2)$, if the criterion "$TBS_{Legacy\_Max} < TBS \leq 1.5 TBS_{Legacy\_Max}$" is satisfied.

As can be seen, the HARQ processes of the cells CC1 and CC2 are stored in the soft buffer according to storage rules of the cells CC1 and CC2, respectively. The soft buffer sizes of the cells CC1 and CC2 for a TB may be different according to design considerations and system specifications. Thus, the communication device can store the HARQ processes flexibly and efficiently. As a result, blocking probabilities of HARQ processes may be decreased, and coding/retransmission performance of the HARQ processes may be improved.

As stated previously, the first parameter and/or the second parameter in the process 30 may be determined according to channel quality related to a channel for transmitting a TB.

Figure 10:
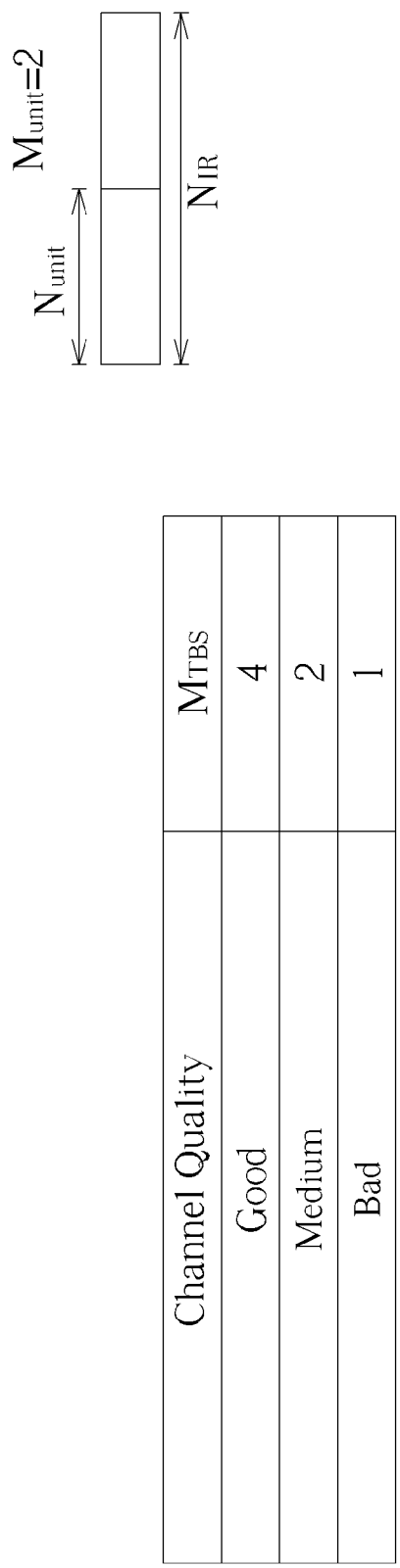

FIG. 10 is a schematic diagram of determination of the second parameter in the process 30 according to an example of the present invention. The basic unit, the first parameter, the second parameter, the legacy soft buffer size for a TB and the soft buffer size for the TB are denoted as $N_{unit}$, $M_{unit}$, $M_{TBS}$, $N_{IR}$ and $M_{TBS}*N_{unit}$ respectively, according to the process 30. The channel quality may be divided into 3 levels including "Good", "Medium" and "Bad", and is not limited herein. In the present example, the basic unit can be obtained as $$N_{unit} = \frac{N_{IR}}{M_{unit}} = \frac{N_{IR}}{2},$$

after assuming the first parameter $M_{unit}=2$. Then, the soft buffer size for the TB can be obtained as $$M_{TBS} * N_{unit} = M_{TBS} * \frac{N_{IR}}{2},$$

wherein the second parameter $M_{TBS}$ depends on the channel quality. As shown in FIG. 10, the legacy soft buffer size for the TB $N_{IR}$ is divided into 2 basic units (with the size $N_{unit}$). For example, a HARQ process may be stored in 4 basic units of the soft buffer wherein a size of each basic unit is $N_{unit}$ if the channel quality is determined as "Good".

Similarly, the network can determine the soft buffer size for the TB according to FIG. 10, to perform a rate-matching procedure. In detail, the network may obtain the basic unit as $$N_{unit} = \frac{N_{IR}}{M_{unit}} = \frac{N_{IR}}{2},$$

after assuming the first parameter $M_{unit}=2$. Then, the network may obtain the soft buffer size for the TB as $$M_{TBS} * N_{unit} = M_{TBS} * \frac{N_{IR}}{2},$$

wherein the second parameter $M_{TBS}$ depends on the channel quality. For example, the network may determine that the soft buffer size for the TB is $2*N_{unit}$ if the channel quality is determined as "Medium".

The legacy soft buffer size for a TB $N_{IR}$ may be determined according a UE category of the communication device. A set of the abovementioned parameters may be combined into a single parameter. For example, the soft buffer size for a TB $$M_{TBS} * N_{unit} = \frac{N_{IR}}{M_{unit} / M_{TBS}}$$

can be obtained according to the above examples, and the first parameter $M_{unit}$ and the second parameter $M_{TBS}$ can be combined into a single parameter $K=M_{unit}/M_{TBS}$ for modifying the legacy soft buffer size for the TB to obtain the soft buffer size for the TB. Further, the soft buffer size for the TB can be modified as $$\lfloor M_{TBS} * N_{unit} \rfloor = \left\lfloor \frac{N_{IR}}{M_{unit} / M_{TBS}} \right\rfloor,$$

to avoid that the soft buffer size for the TB is not an integer, wherein $\lfloor \cdot \rfloor$ is a floor function.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

Examples of the hardware may include analog circuit(s), digital circuit (s) and/or mixed circuit (s). For example, the hardware may include ASIC(s), field programmable gate array(s) (FPGA(s)), programmable logic device(s), coupled hardware components or combination thereof. In another example, the hardware may include general-purpose processor(s), microprocessor(s), controller(s), digital signal processor(s) (DSP(s)) or combination thereof.

Examples of the software may include set(s) of codes, set(s) of instructions and/or set(s) of functions retained (e.g., stored) in a storage unit, e.g., a computer-readable medium. The computer-readable medium may include SIM, ROM, flash memory, RAM, CD-ROM/DVD-ROM/BD-ROM, magnetic tape, hard disk, optical data storage device, non-volatile storage unit, or combination thereof. The computer-readable medium (e.g., storage unit) may be coupled to at least one processor internally (e.g., integrated) or externally (e.g., separated). The at least one processor which may include one or more modules may (e.g., be configured to) execute the software in the computer-readable medium. The set(s) of codes, the set(s) of instructions and/or the set(s) of functions may cause the at least one processor, the module(s), the hardware and/or the electronic system to perform the related steps.

Examples of the electronic system may include a system on chip (SoC), system in package (SiP), a computer on module (CoM), a computer program product, an apparatus, a mobile phone, a laptop, a tablet computer, an electronic book or a portable computer system, and the communication device 20.

To sum up, the present invention provides a method of handling a soft buffer size for a TB. The method can be used in a communication device and/or the network. According to the present invention, a blocking probability of a HARQ process (e.g., DL HARQ processes) can be decreased, and coding/retransmission performance of the HARQ process can be improved. In addition, the present invention is backward compatible if the parameter(s) is properly designed.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of determining a soft buffer size for a transport block, the method comprising:
    determining a basic unit for the soft buffer size according to a legacy soft buffer size for the transport block and a first parameter; and
    determining the soft buffer size for the transport block according to the basic unit and a second parameter;
    wherein the basic unit is determined according to the following equation:

$$N_{unit} = \frac{N_{IR}}{M_{unit}},$$

where $N_{unit}$ is the basic unit, $N_{IR}$ is the legacy soft buffer size for the transport block, and $M_{unit}$ is the first parameter;
    wherein the soft buffer size for the transport block is $M_{TBS}*N_{unit}$, where $M_{TBS}$ is the second parameter.

2. The method of claim 1, wherein the legacy soft buffer size for the transport block corresponds to a modulation level not greater than 64 quadrature amplitude modulation (64QAM).

3. The method of claim 1, wherein the soft buffer size for the transport block corresponds to a modulation level greater than 64QAM.

4. The method of claim 1, wherein a set of the first parameter and the second parameter is determined according to channel quality related to a channel for transmitting the transport block.

5. The method of claim 1, wherein a set of the first parameter and the second parameter is determined according to a user equipment (UE) category of a communication device processing the transport block.

6. The method of claim 1, wherein a set of the first parameter and the second parameter is a cell-specific parameter.

7. The method of claim 1, wherein a set of the first parameter and the second parameter is determined according to a size of the transport block.

8. The method of claim 1, wherein a set of the first parameter and the second parameter is determined according to a maximum transport block size.

9. The method of claim 1, further comprising the step of:
    allocating a first hybrid automatic repeat request (HARQ) process corresponding to the transport block in at least one basic unit of a soft buffer according to the soft buffer size for the transport block, wherein each of the at least one basic unit is determined according to the legacy soft buffer size for the transport block and the first parameter.

10. The method of claim 9, further comprising:
    releasing part of the at least one basic unit of the first HARQ process; and
    allocating the second HARQ process in the part of the at least one partition.

11. The method of claim 1, further comprising the step of:
    performing a rate matching on the transport block according to the soft buffer size for the transport block.

12. The method of claim 1, wherein the soft buffer size for the transport block is $$\frac{N_{IR}}{K}, \text{ where } K = \frac{M_{unit}}{M_{TBS}}$$

is a combined parameter determined according to the first parameter $M_{unit}$ and the second parameter $M_{TBS}$.

13. The method of claim 1, wherein the soft buffer size for the transport block is $\lfloor M_{TBS}*N_{unit} \rfloor$, where $\lfloor \bullet \rfloor$ is a floor function.

14. A communication device for determining a soft buffer size for a transport block, comprising:
    a storage unit for storing instructions of:
    determining a basic unit for the soft buffer size according to a legacy soft buffer size for the transport block and a first parameter; and
    determining the soft buffer size for the transport block according to the basic unit and a second parameter,
    wherein the basic unit is determined according to the following equation:

$$N_{unit} = \frac{N_{IR}}{M_{unit}},$$

where $N_{unit}$ is the basic unit, $N_{IR}$ is the legacy soft buffer size for the transport block, and $M_{unit}$ is the first parameter;

wherein the soft buffer size for the transport block is $M_{TBS}*N_{unit}$, where $M_{TBS}$ is the second parameter; and a processing means, coupled to the storage unit, configured to execute the instructions stored in the storage unit.

15. A computer program product for determining a soft buffer size for a transport block, comprising:

a computer-readable medium comprising:

a first set of codes for causing the computer program product to determine a basic unit for the soft buffer size according to a legacy soft buffer size for the transport block and a first parameter; and a second set of codes for causing the computer program product to determine the soft buffer size for the transport block according to the basic unit and a second parameter;

wherein the basic unit is determined according to the following equation:

$$N_{unit} = \frac{N_{IR}}{M_{unit}},$$

where $N_{unit}$ is the basic unit, $N_{IR}$ is the legacy soft buffer size for the transport block, and $M_{unit}$ is the first parameter;

wherein the soft buffer size for the transport block is $M_{TBS}*N_{unit}$, where $M_{TBS}$ is the second parameter.

* * * * *